Nov. 11, 1958     H. L. McCARLEY     2,859,648
CLAMP TIGHTENER
Filed March 15, 1955
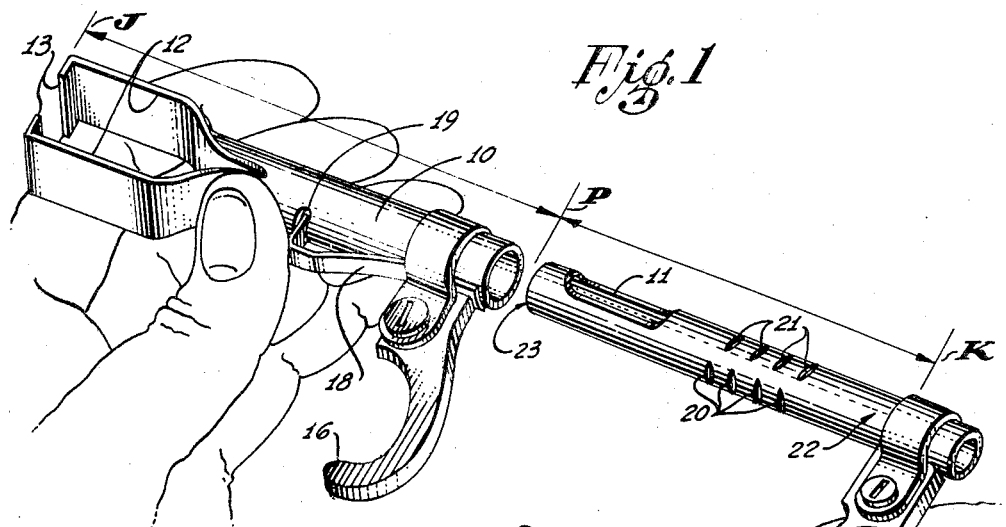
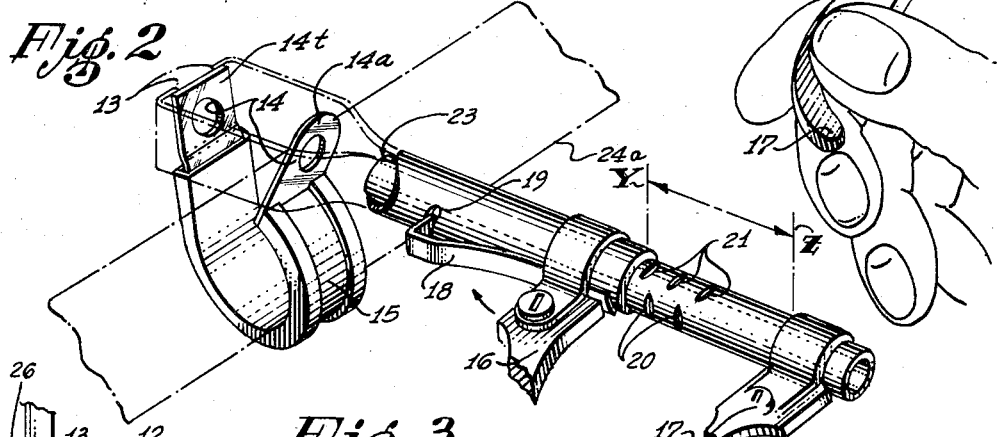
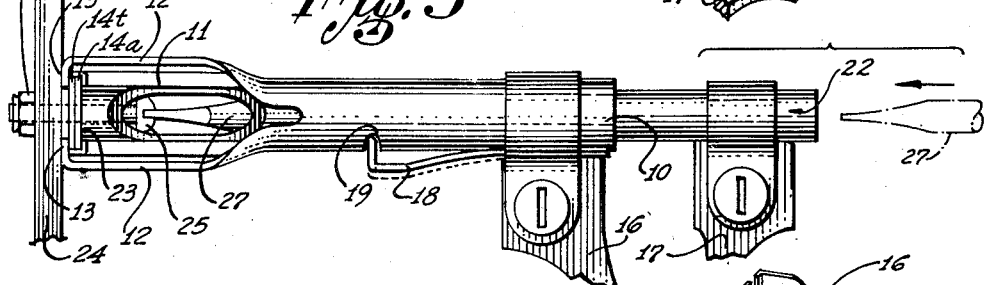
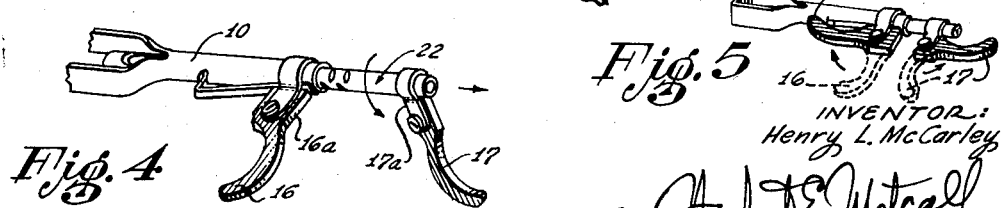
INVENTOR:
Henry L. McCarley
By Hubert E. Metcalf
His Patent Attorney

United States Patent Office 2,859,648
Patented Nov. 11, 1958

2,859,648

CLAMP TIGHTENER

Henry L. McCarley, Compton, Calif., assignor to Northrop Aircraft, Inc., Hawthorne, Calif., a corporation of California Application March 15, 1955, Serial No. 494,465

7 Claims. (Cl. 81—3)

This invention relates to hand tools used for grasping, squeezing and positioning purposes, and more particularly to a device for engaging and squeezing together the perforated end tabs of a generally circular strap type clamp, then holding the clamp in any desired position while fastening the tabs around a conduit or attaching it to a structure.

The particular variety of clamp with which the holding device of my invention is best adapted for use, is widely used in the assembly of aircraft and other vehicles for attaching electrical and fluid conduits to internal structural members and surfaces, and is known as a line or conduit clamp. In general it resembles a conventional hose clamp which is formed by bending the ends of a circular band outwardly and backwardly to provide identical end tabs disposed normally to the curvature of the strap portion. In the conduit clamp, however, one of the perforated end tabs is extended tangentially from the arc of the strap portion thereby providing a flat outer surface area which is positioned against the structure, and the second tab is bent outwardly and backwardly from the arc of curvature of the strap portion at an acute angle much sharper than those of the hose clamp tabs so that it will assume parallel alignment with the tangental tab when drawn adjacent thereto by the tensioning means.

The tangental disposition of one of the end tabs, which is typical of the conduit clamp, is significant with relation to my invention for the reason that this feature makes the conduit clamp even more difficult to maneuver into proper position relative to the conduit, the structure and the means of attachment therewith while holding the end tabs together and in proper alignment at the same time. This is particularly true in corners and relatively in accessible locations to which there is no direct frontal access.

One important object of my invention, which was made with the foregoing in mind, is the provision of a simple manually operable clamp with which the normally separated perforated end tabs of a line clamp may be squeezed together into tight juxtaposition with the perforations therein disposed in proper alignment.

Another object of my invention is the provision of clamping means, as described, being further adapted to hold the tab ends of a line clamp in aligning juxtaposition until secured to the structure and, additionally being conformed to permit entry of a screw or bolt through the tab perforations into the structure without removing or changing the position of the clamping means.

A further important object of my invention is the provision of a work holding clamp as previously described which in order to be operable in cramped spaces and awkward positions requires a minimum of lineal and lateral movement of its various parts when in use, and is as small as possible in overall dimensions.

In brief, my invention consists of a device having a sleeve member and a plunger member. The sleeve is split at one end to provide a yoke section with inbent ends. There is a half-handle at the end opposite from the yoke and a positioning dog intermediate of the yoke and handle. The plunger member is tubular and is slidable within the sleeve. It has a half-handle positioned oppositely from that on the sleeve and is terminated at the opposite end adjacent the yoke portion of the sleeve in a square cut end.

The plunger also has a longitudinally extended opening in its wall beginning near its square cut end, and a plurality of notches engageable by the dog in the sleeve member.

In use the inbent ends of the yoke section of the sleeve are placed behind the tangental tab of the conduit clamp, and the square end of the plunger is positioned against the outer face of the tab disposed normal to the circumference of the clamp. Then the two half-handles are squeezed together. When the two inner faces of the two tabs are tightly juxtaposed, the dog drops into a notch in the plunger. The clamp, still gripped in the device, is placed over the hole in the structure at which the clamp is to be fastened and a bolt is slipped through the longitudinally extended opening in the wall of the plunger in the open yoke section of the sleeve member, through the aligning holes in the two tabs and the hole in the structure. A long-shanked screw driver may then be passed through the plunger member to turn the bolt into a nut member on the opposite side of the structure. Before tightening is completed, the positioning dog is disengaged, the plunger is drawn out from around the head of the bolt, and the inbent ends of the sleeve are removed from between the tangential tab and the structure.

Additional objects of this invention will become apparent in the following description of one preferred embodiment thereof when read with reference to the accompanying drawings in which:

Figure 1 is a perspective diagram showing the two major parts of the device with the plunger member positioned for entry into the sleeve member.

Figure 2 is a perspective view similar to Figure 1 showing the two members partially engaged and the yoke of the sleeve member positioned around the clamp to be tightened.

Figure 3 is a plan view showing the parts of the device completely engaged and holding together the end tabs of a conduit clamp.

Figure 4 is a perspective view indicating the manner in which the parts of the device are separated and removed from the work piece.

Figure 5 is a perspective view similar to Figure 4 showing the handles of the tool folded inwardly adjacent and in alignment with the sleeve member.

All of the parts included in this particular embodiment of my invention can be clearly seen in Figure 1. The plunger member 22, seen at the right of Figure 1, is fitted with a half-handle member 17 at one end and is terminated in a squarely cut end section 23 at its other end providing a circular vertically disposed edgewise bearing surface aligning coaxially with the bores 14 in the end tabs 14t and 14a of the conduit clamp 15, best seen in Figure 2. A plurality of rows of positioning notches such as 20 and 21 in Figures 1 and 2 are provided in the outer surface of the plunger shank intermediate of the ends. The plurality of rows of notches enables the operator to swing either handle to any circumferential position relative to the radial positioning of the handle of the other member found to be most convenient when working in cramped quarters.

The plunger member 22 is adapted in diameter to fit slidably within the hollow bore of the sleeve member 10 and is adapted in length to extend through the tubular shank portion of the sleeve and across the open area of the yoke portion thereof between the spaced parallel sides 12 to the inbent ends 13 thereof, as indicated by sections of equal length JP and KP in Figure 1. At its end spaced from the inbent ends 13, the sleeve is fitted with a curved half-handle member 16 having its concave side disposed toward the yoke end and opposite to that of the plunger handle 17. A slot 19 is disposed in the wall of the sleeve through which the inbent end of a leaf spring 18 moves into engagement with notches 20 and 21 depending upon the relative radial position of the handle 17 and the sleeve associated therewith, when the plunger member 22 is deeply inserted into the sleeve 10.

Since the device can be made in sizes to suit any size clamps and retaining bolts, only relative dimensions and proportions can be cited. The length JP of sleeve member 10 including the handle portion thereof is made sufficient to receive the tubular shank section KP of plunger member 22, and it will be noted that when the shank length KP is entered within the total length JP of sleeve member 10, the depending handle portion 17 of plunger 22 is still disposed outwardly of sleeve 10, as seen in plan view in Figure 3 and in perspective in Figure 5.

In Figure 3 the plunger 22 is shown completely inserted in sleeve 10 with its edgewise end surface bearing against the clamp end tab 14a with tab 14a, in turn, bearing against tab 14t. The inbent ends 13 of yoke arms 12 are seen flushed against the structural member 24. Also a bolt 25 is shown extending through the structure. It is visible through the aperture 11 in plunger 22, together with a nut 26 on the opposite side of the structure, and a screw driver 27 enterable into the head of the bolt.

In Figure 4 the manner in which the plunger member 22 is removed from locked attachment within sleeve 11 is shown. The plunger handle 17 is turned an eighth of a turn to the right or left, thereby disengaging the tip at 19 of the spring 18 from within one of the rows of notches 20 and 21 as seen in Figures 1 and 2.

It will also be noticed in Figure 4 that each of the half-handle members 16 and 17 is square at the corners 16a and 17a disposed on the side of the convex portions of the respective handles at the ends abutting against the sleeve and plunger members, and also that they are rounded on the concave sides so that the half-handles bear against their square corners when they are squeezed together yet may be folded flat against the tubular portions of the device as shown in Figure 5.

While it is true that much more lineal range, YZ in Figure 2, within which the sleeve and plunger may be locked in relative positioning, has been provided than will most often be required, the lineal range indicated by YZ has been provided so that the two tab ends of the clamp could be held together while the materials 24a within the clamp were being arranged, removed or replaced. In only rare cases would the thickness of the structural wall require a bolt of the length indicated by the range YZ.

The operation of the invention is as follows: The tabs 14t and 14a of a clamp 15 are inserted between the sides 12 inbent ends 13 and tubular sleeve member 10. The tubular plunger 22 is inserted in the sleeve member 10 and the end section 23 is brought to bear against tab 14a. The sleeve member 10 and plunger member 22 are moved relative to each other, through the medium of handles 16 and 17, in such a manner as to urge the tabs into parallel contacting relationship. When the tabs are in the last mentioned position a spring 18 on the sleeve 10 engages notches 20 or 21 in plunger 22 to lock the members in the selected position and a bolt 25 is inserted into an opening 11 in the plunger 22. The bolt is then urged through the registered openings in the tabs 14t and 14a and a nut is threaded thereon to hold the clamp 15 in the urged position. An instrument 27 is inserted through the plunger 22 to tighten the bolt 25 to the nut 26.

In order to comply with the statute this invention has been described hereinbefore and illustrated in the accompanying drawings in one particular embodiment and in considerable detail concerning structure and relative dimensions, but it is to be understood that the foregoing is subject to change and the invention is not, therefore, to be limited in any way except as indicated by the scope of the following claims.

What is claimed is:

1. A holding and tightening device comprising: two main members including a tubular plunger member slidable within a tubular sleeve member; said sleeve member having diametrically opposed longitudinal slots cut inwardly on the tubular wall from one end thereof, and the remaining tubular wall sections spaced on opposite sides of said longitudinal slots being terminated in inbent ends disposed toward the axis of said tubular sleeve member and adapted to engage an object entered through one of said slots; said plunger member being slidable through said sleeve member into endwise contact with an object entered through one of said slots.

2. The invention in accordance with claim 1 together with means for holding said main members in relative lineal positioning comprising: a longitudinally extended leaf spring fixedly attached at one of its ends to the outer periphery of said sleeve and having its other end inbent at right angles toward the sleeve and having its terminal edge rounded convexly and opposite to the arc of the circumference of said sleeve; a circumferentially extended slot in the wall of said sleeve positioned and adapted to receive said inbent end of said leaf spring; a plurality of spaced notches disposed in longitudinal alignment in the wall of said plunger member parallel to the longitudinal axis thereof, said notches having radially disposed edges, their sides disposed toward the object-contacting end of said plunger and angular edges slanted outwardly from the inner surface of the wall of the said plunger in the direction of the handle portion thereof, said notches being of sufficient width to receive the entire width of said inbent end of said leaf spring when positioned adjacent to said slot in said sleeve member.

3. The invention in accordance with claim 1 together with means for locking said main members in relative radial and lineal positioning comprising: a plurality of lengthwise rows of spaced notches longitudinally aligned about the outer periphery of said plunger member parallel to the axis thereof and disposed at equal radial angles therefrom; and a notch-engaging spring element mounted on said sleeve member.

4. The invention in accordance with claim 1 in which handle means by which said plunger end may be urged to bear against said inbent ends of said sleeve comprise: a half-handle laterally disposed from said sleeve member at the end thereof spaced from said inbent ends, said half-handle being generally rectangular except for a concavity along one longitudinal edge, said concavity being disposed on the side toward said inbent ends; a similar half-handle attached to the outward end of said plunger member having its concave area disposed oppositely from that of said handle on said sleeve, whereby squeezing the two half handles together presses said plunger member inwardly of said sleeve bringing the edgewise end surface of said plunger into contact with the inbent ends of said sleeve member or any object positioned therebetween.

5. A holding and tightening device comprising a tubular sleeve member having on one end thereof spaced apart, object engaging hooks; and a tubular plunger member, slidable within said sleeve member, one end of which engages said object; said plunger member having an opening therein adjacent the object engaging end into which may be inserted an object retaining fastener.

6. A holding and tightening device comprising a tubular sleeve member having on one end thereof spaced apart object engaging hooks; and a tubular plunger member, slidable within said sleeve member, one end of which engages said object; said plunger member having an opening therein adjacent the object engaging end into which may be inserted an object retaining fastener; said plunger member and sleeve member having structure thereon that releasably locks said members in an object engaging position.

7. A holding and tightening device comprising a tubular sleeve member having on one end thereof spaced apart object engaging hooks; and a tubular plunger member, slidable within said sleeve member, one end of which engages said object; said plunger having an opening therein adjacent the object engaging end into which may be inserted an object retaining fastener; said sleeve and plunger members each having elements thereon that enable the two members to be moved relative to each other.

References Cited in the file of this patent

UNITED STATES PATENTS

| | | |
|---|---|---|
| 1,301,185 | Sorensen | Apr. 22, 1919 |
| 1,539,736 | Hearonemus | May 26, 1925 |
| 1,724,435 | Studwell | Aug. 13, 1929 |
| 2,409,784 | Morehouse | Oct. 22, 1946 |
| 2,454,878 | Marler | Nov. 30, 1948 |